United States Patent [19]

Masters

[11] Patent Number: 4,980,112
[45] Date of Patent: Dec. 25, 1990

[54] METHOD FOR ROTATIONAL MOLDING

[76] Inventor: William E. Masters, 313 Dogwood La., Easley, S.C. 29640

[21] Appl. No.: 211,050

[22] Filed: Jun. 24, 1988

[51] Int. Cl.$^5$ .............................................. B29C 41/04
[52] U.S. Cl. .................................. 264/225; 264/257; 264/311; 249/134; 249/135
[58] Field of Search .................... 249/134, 135, 114.1; 264/310, 311, 219, 220, 225, 226, 227, 257, 129

[56] References Cited

U.S. PATENT DOCUMENTS

| | | | |
|---|---|---|---|
| 2,750,632 | 6/1965 | Kish | 249/135 |
| 3,153,915 | 10/1964 | Deith | 249/134 |
| 3,292,894 | 12/1966 | Falkenau | 249/134 |
| 3,386,503 | 6/1968 | Corning | 425/384 |
| 3,607,569 | 9/1971 | Greenwell | 264/274 |
| 3,622,659 | 11/1971 | Sonia | 264/220 |
| 4,049,767 | 9/1977 | Vaidya | 425/435 |
| 4,105,184 | 8/1978 | Sumitomo | 264/219 |
| 4,146,565 | 3/1979 | Quraishi | 264/219 |
| 4,394,340 | 7/1983 | Tarumi | 264/219 |
| 4,601,867 | 7/1986 | Martell | 264/225 |

*Primary Examiner*—Jay H. Woo
*Assistant Examiner*—Jeremiah F. Durkin, II
*Attorney, Agent, or Firm*—Cort Flint

[57] ABSTRACT

A method for rotational molding a thermoplastic article using a mold made of a fiber reinforced thermoset resin which has a heat distortion point above the melting point of the thermoplastic material. Metal or other materials may be used to provide different coefficients of heat transfer at preselected portions of the mold. The entire mold may include a thermal coefficient modifier to increase the heat transfer rate of the mold uniformly over the entire mold in addition to the preselected portions.

13 Claims, 5 Drawing Sheets

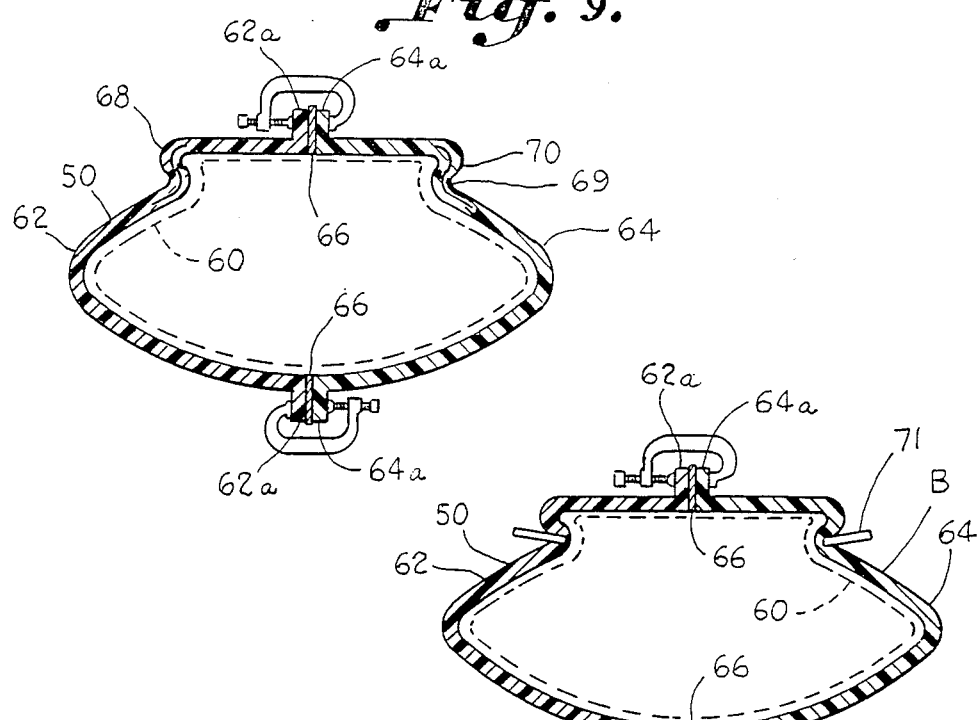
Fig. 9.
Fig. 8.
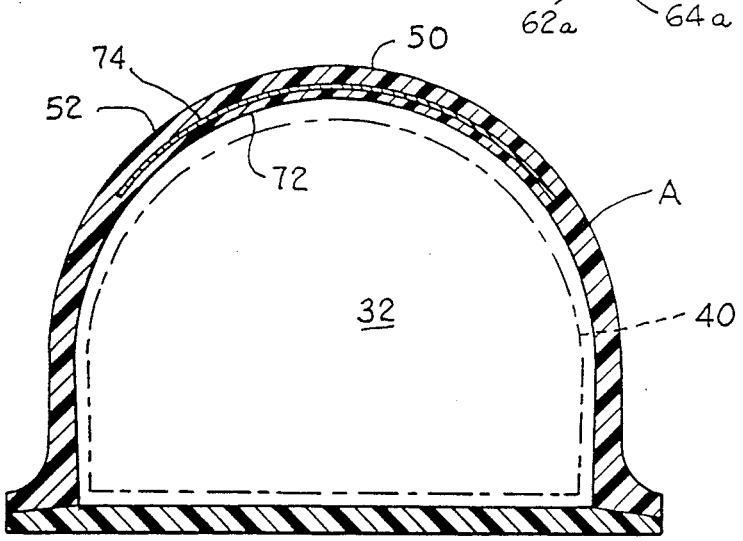
Fig. 10.

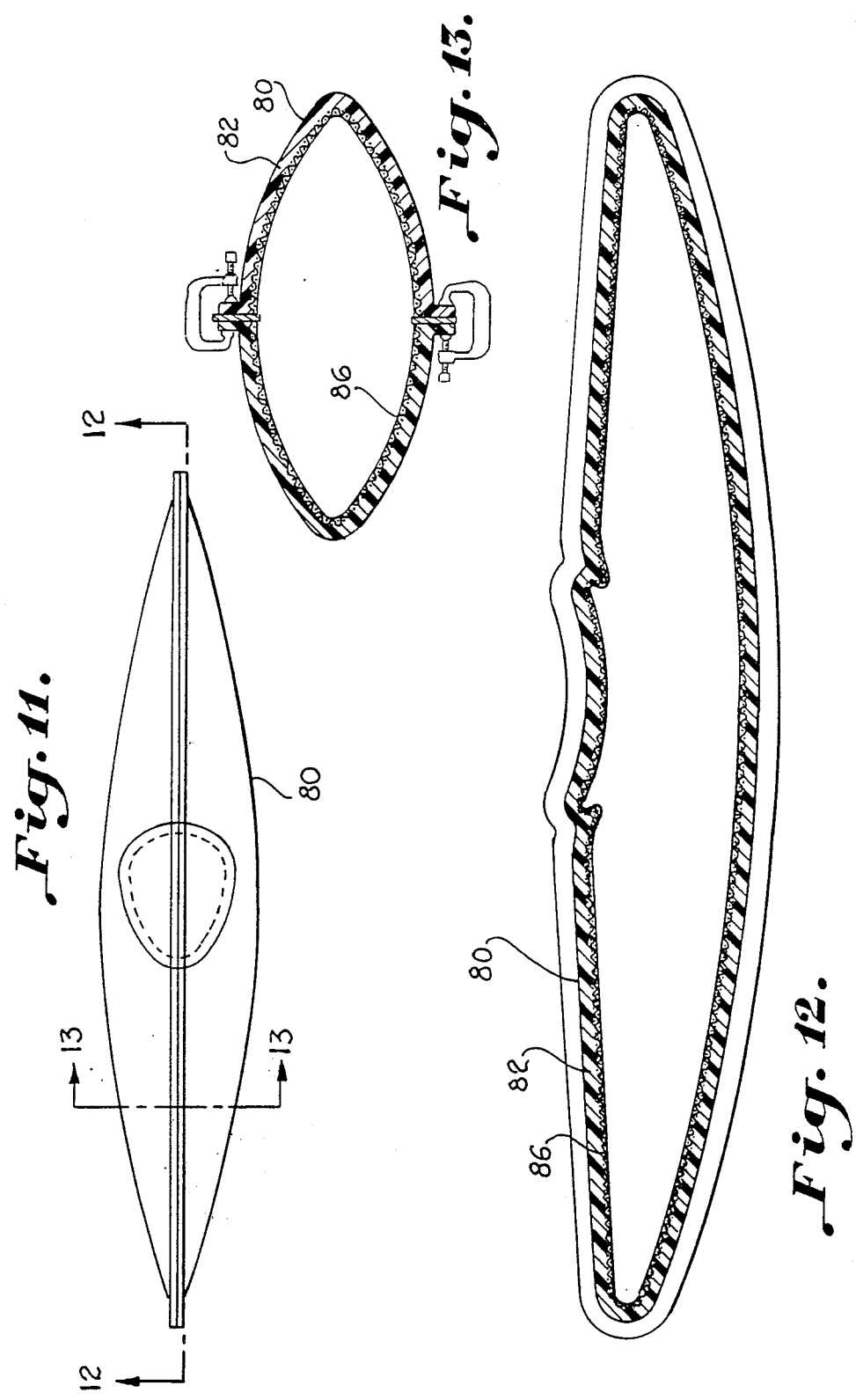

METHOD FOR ROTATIONAL MOLDING

BACKGROUND OF THE INVENTION

The invention relates to a rotational molding process for molding articles, and more particularly to a mold and method for use in a rotational molding process in which fiber reinforced thermoset plastic material is used to fabricate the mold in lieu of conventional materials to facilitate design changes and prototyping with low cost tooling.

Rotational molding is a unique process, as compared to injection molding and blow molding. It allows the producer greater flexibility in end-product design, especially for hollow parts, beveled wall constructions and large sizes where conventional tooling would make end-product costs prohibitive. Products can be rotationally molded, ranging from small syringe bulbs to large storage tanks or shipping containers. Other typical products rotationally molded include bumpers, dolls, squeeze toys, basketballs, footballs, automotive armrests and headrests, and boat hulls. In rotational molding, the product is formed inside a closed mold or cavity while the mold is rotating bi-axially in a heating chamber. Rotational molding is best suited for large, hollow products requiring stress-free strength, complicated curves, a good finish, a variety of colors, a controlled duration production run, and uniform wall thickness. There are basically four steps in rotational molding: loading, molding or curing, cooling, and unloading. In the loading stage, either liquid or powdered plastic is charged into a hollow mold. In the oven, heat penetrates the mold causing the plastic to adhere to the mold surface. Since the mold continues to rotate while heating is going on, the plastic will gradually become distributed evenly on the mold walls through gravitational force. As the cycle continues, the polymer melts completely, forming a homogeneous layer of molten plastic.

While rotational molding allows the designer much flexibility in the design of the end-product, the cost for tooling and molds is still relatively expensive and is too high to allow changes for new designs, short runs, custom work, or prototyping. Molds used in rotational molding have been constructed from one or more of several metals. Machined aluminum generally gives parts which are free of surface porosity or voids. Cast aluminum molds have been used for rapid heat transfer, and are probably the most widely used in rotational molding. Initial cavity cost may be relatively high since a model and/or pattern are required. Electroformed nickel molds are another type used in rotational molding. This type of mold is noted as more durable than cast aluminum. Sheet metal molds are also used in rotational molding, particularly for large parts or single cavities requiring inexpensive tools. Prototype molds are often fabricated in sheet metal for reasons of cost, though eventually production molds are usually made of cast aluminum. While sheet metal tooling is relatively cheap, it does not easily allow for curved and contoured molding. Because of the relative high cost of cast aluminum molds, the design of the molded part is usually not readily changed. Production must be run until the change in design and cost of a new mold can be justified. The marketing of rotationally molded parts becomes limited in terms of meeting rapidly changing tastes and conditions, and for short run custom designs. The conventional molds have also been expensive in terms of repair costs.

Typical metallic molds and processes for rotational molding are disclosed in U.S. Pat. Nos. 4,457,729, 4,247,279 (aluminum), 4,238,537, 3,843,285, 3,966,870 (nickel), 3,652,368, and 2,681,472 (steel).

Accordingly, an object of the invention is to provide an alternate, low cost mold and process for use in rotational molding which is simple and inexpensive to tool and fabricate.

Another object of the invention is to provide a mold and method for use in rotational molding which uses relatively low cost tooling to make feasible short run design changes or prototyping.

Another object of the invention is to fabricate molds for rotational molding using fiber reinforced thermoset plastics which are relatively simple and inexpensive to pattern and fabricate allowing the molded article to readily and quickly change in its design without prohibitive costing.

Yet another object of the invention is a mold and method for rotational molding which is fast, uses inexpensive tooling, and provides a wide variety of curved and contour shaping in the molded article.

SUMMARY OF THE INVENTION

The above objectives are accomplished according to the present invention by utilizing a mold in a rotational molding process which is constructed from a thermoset plastic material rather than metal. The thermoset plastic material is selected to have a heat distortion point above the melting point of the polymeric material being molded. The plastic mold and material are heated at a lower temperature, but for a longer duration than in the case of conventional metallic molds. While the molding cycle may be longer, the use of a thermoset plastic mold allows for quick design changes for short runs, custom work, or prototyping. Metal may be added to the plastic mold to increase heat transfer area at portions of the mold where heat transfer is retarded or where additional thickness in the molded article is desired. In addition, the entire mold may include a heat transfer rate modifier, for example, woven wire, which increases the heat transfer uniformly over the plastic mold with the preselected portions of the mold receiving the additional increase in transfer rate for additional article thickness.

DESCRIPTION OF THE DRAWINGS

The construction design to carry out the invention will hereinafter be described, together with other features thereof.

The invention will be more readily understood from a reading of the following specification and by reference to the accompanying drawings forming a part thereof, wherein an example of the invention is shown and wherein:

FIG. 8 is a sectional view taken along line 8—8 of FIG. 6;

FIG. 9 is a sectional view taken along a line similar to that of FIG. 8 illustrating another embodiment of a heat transfer rate modifier in the over hang part of the cockpit seat;

FIG. 10 is a sectional view of a plastic mold having a heat transfer rate modifier in the top for increase thickness of a helmet article being molded;

FIG. 11 is a top plan view of another embodiment of a plastic mold according to the invention;

FIG. 12 is a sectional view taken along line 12—12 of FIG. 11; and

FIG. 13 is a sectional view taken along line 13—13 of FIG. 11.

DESCRIPTION OF A PREFERRED EMBODIMENT

The invention relates to an improvement in a rotational molding process which allows for design changes for short runs and prototyping with low cost tooling.

Figure 1:
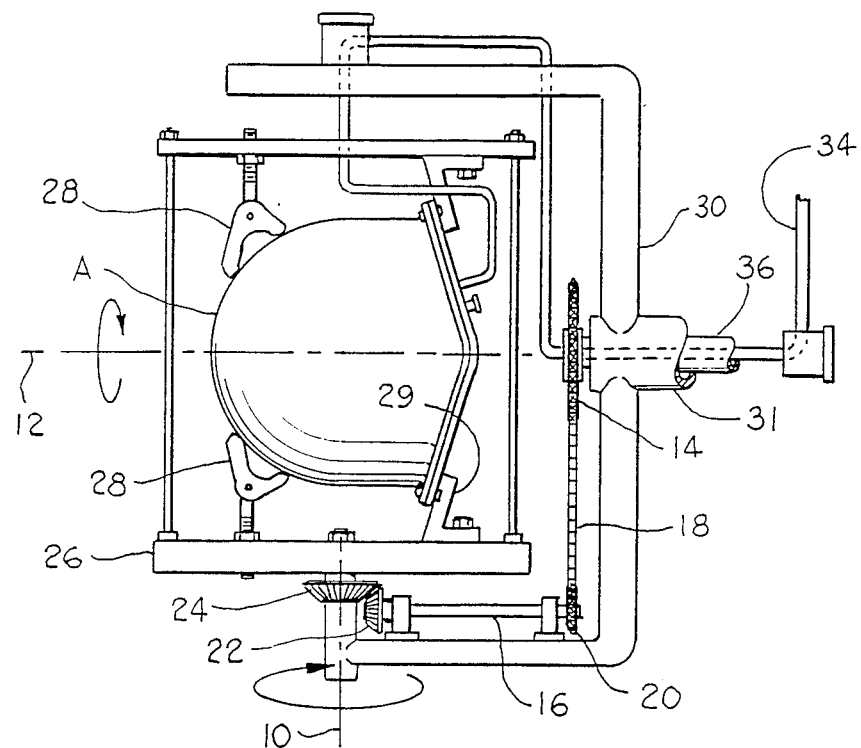
FIG. 1 is an elevation of a rotational molding process in which a mold structured from a plastic material is utilized in accordance with the invention.
Figure 4:
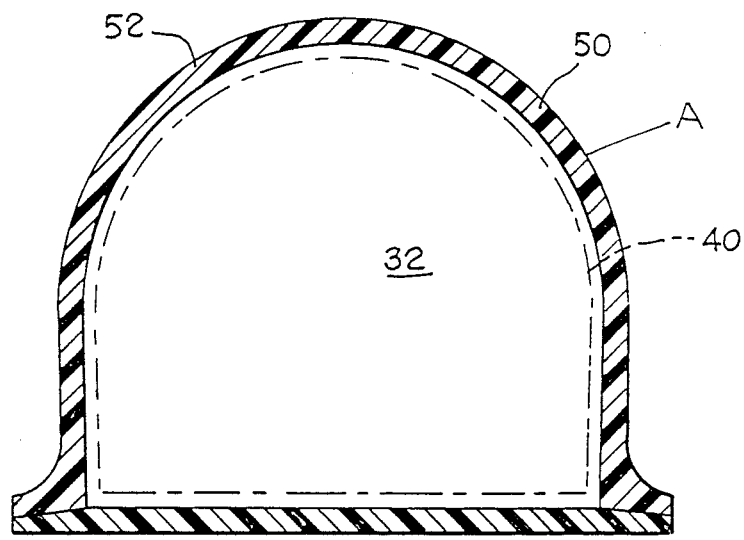
FIG. 4 is a sectional view taken along line 4—4 of FIG. 3.

Referring now in more detail to the drawings, a rotational molding process is illustrated in FIG. 1 in which a mold A constructed in accordance with the invention is rotated about a first axis 10 and a second axis 12 orthogonal to axis 10. The rotational molding apparatus includes a chain drive sprocket 14 which drives a shaft 16 via a drive chain 18 and sprocket 20. A beveled gear 22 affixed to shaft 16 drives another beveled gear 24 affixed to a frame 26 in which mold A is clamped by clamps 28 and 29. This drive rotates mold A about axis 10. A second frame 30 may be rotated about axis 12 by a second drive (not shown) which rotates a shaft 31 in a conventional manner. Polymeric material is delivered to a cavity 32 (FIG. 4) of mold A by any suitable means such as a delivery line 34 routed through a suitable rotary journal 36 and other parts of the apparatus to mold A. Any suitable apparatus may be used to rotate the mold, and the simple apparatus in FIG. 1 is shown for illustrative purposes only. The mold and method of the present invention may be utilized with any rotational molding machine. The rotational molding system shown in U.S. Pat. No. 4,247,279 issued to the present inventor is particularly applicable to the present invention. The patented rotational molding system and the present invention are both highly advantageous for molding a kayak article.

Figure 2:
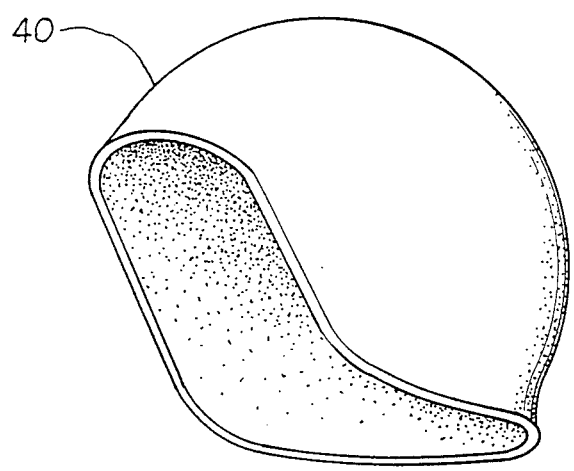
FIG. 2 illustrates an article molded in a rotational molding process in accordance with the invention.
Figure 3:
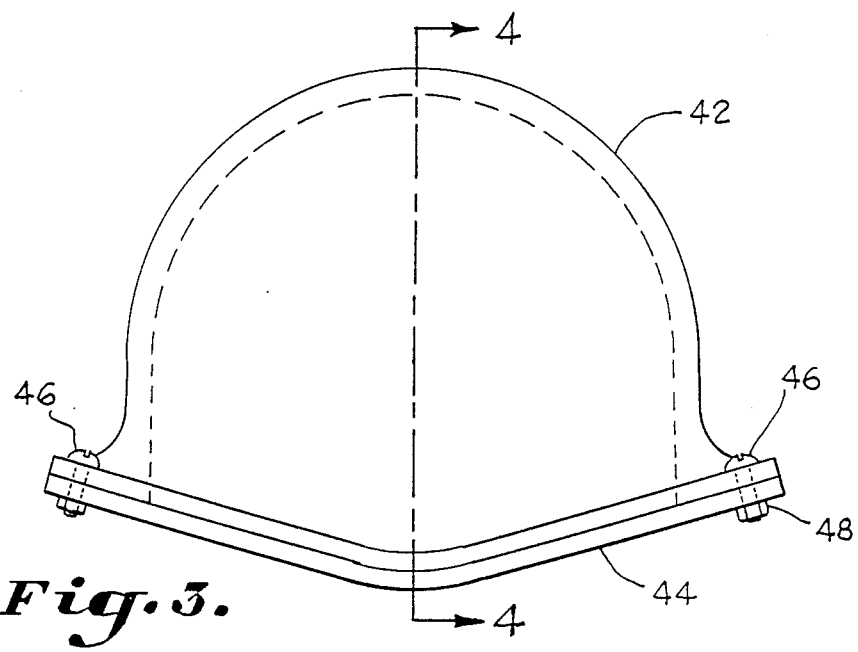
FIG. 3 illustrates a plastic mold for use in a rotational molding process in accordance with the invention.

A kayaker's helmet article or pattern 40 is shown in FIG. 2. As can best be seen in FIGS. 3 and 4, mold A is illustrated and patterned after helmet 40. Mold A for molding the helmet article includes a first part 42 and a second part 44 which are fastened together by suitable fasteners such as bolts 46 and nuts 48. As can best be seen in FIG. 4, mold A is constructed from a plastic material 50. Plastic material 50 is preferably a thermoset plastic material such as an epoxy, polyester, or vinyl ester resin. Preferably, the thermoset plastic materials are reinforced with fibers 52 such as glass, graphite, or steel fibers. The helmet article 40 is molded from a suitable thermoplastic polymeric material like nylon or polyethylene, for example.

Figure 5:
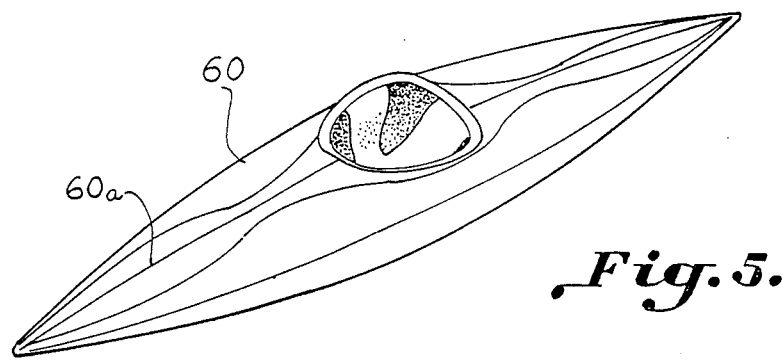
FIG. 5 is a perspective view of a kayak molded in accordance with the invention.
Figure 6:
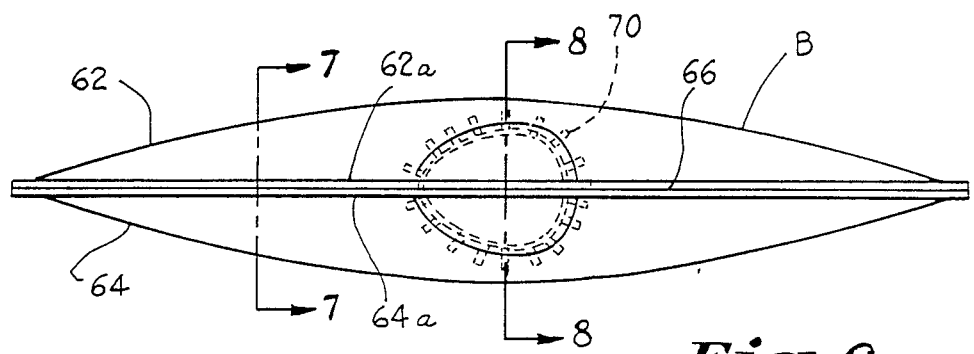
FIG. 6 illustrates an exemplary embodiment of another plastic mold for use in a rotational molding process according to the invention.
Figure 7:
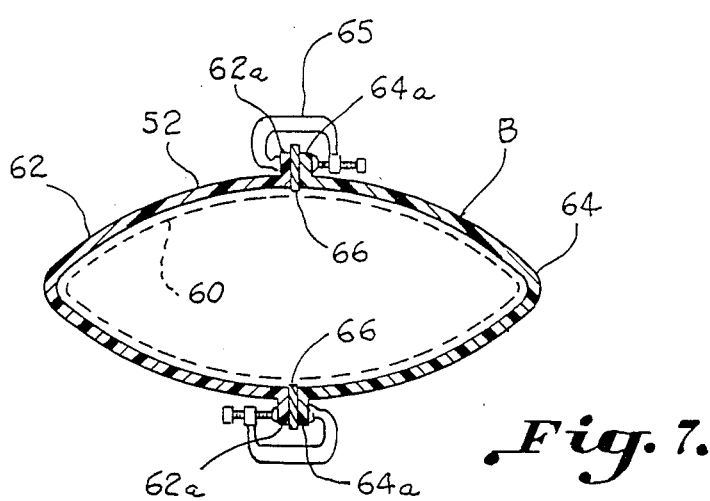
FIG. 7 is a sectional view taken along line 7—7 of FIG. 6.

FIG. 5 shows a kayak 60 molded from a plastic polyethylene material. As can best be seen in FIGS. 6 through 8, a mold B for molding the kayak is illustrated which is also constructed from a suitable plastic material 50 like the thermoset plastic resin described above. Mold B is in two parts, 62 and 64, having mating flanges 62a and 64a joined together during molding by suitable fasteners or clamps 65. In a conventional molding process such as that shown in U.S. Pat. No. 4,247,279, the mold for kayak 60 is constructed from a cast aluminum material. The molding cycle includes loading the metal mold with a powdered polyethylene material, rotating the mold bi-axially for approximately 30 minutes and heating the mold at a temperature of approximately 550 degrees F. The polyethylene material is heated to approximately 370 degrees F. inside the mold cavity. The melt point of the polyethylene material is approximately 275 degrees F. The polyethylene is heated and fuses to form a layer of material on the inner surface of the mold. In accordance with the present invention, a plastic mold, like A or B, is heated at a lower temperature and for a longer duration than the conventional metallic mold. For example, a thermoset plastic mold may be heated at oven temperatures of 300 to 500 degrees F. for a period of 45-90 minutes when molding a kayak compared to the metal mold described above.

According to the present invention, plastic molds A and B are molded from a thermoset plastic material having a heat distortion point greater than the melt point of the polymeric material from which articles 40 and 60 are molded. It is preferred that the thermoplastic polymeric material from which the article is molded has a melting point of less than about 423 degrees F., and that the thermoset plastic material 50 of plastic molds A and B has a heat distortion point greater than about 423 degrees F. Since the plastic mold will more than likely have a lower heat transfer rate than a conventional metal mold and can not be heated to as high a temperature without distortion, a longer curing time for the molded material will be needed in the molding cycle. It may also be likely that the plastic mold material does not distribute heat sufficiently in some portions of the mold to mold the article accurately at a given portion, or to mold a desired thickness at a particular portion of the article. In this case, the plastic mold of the present invention may include metal conductors at selected portions to transfer heat at different rates causing the polymeric material being molded to become thicker in specified portions of the article. For example, in the kayak of FIG. 6, a metallic heat conductor 66 may be included along the part line of the mold. This offsets the insulation effect of the glass fibers flanges 62a and 64a which produce thickness along the part line. Secondly, metallic conductor strip 66 may advantageously create a rib 60a on the top and bottom molded part due to the faster heat transfer which reinforces the article, and causes more resin to build up. It is also contemplated that particles may be added to the resin matrix of the mold material to provide faster heat transfer. Overhang 68 in the cockpit portion of mold B forms an undercut 69 in the mold which may shadow and reduce heat transfer at adjacent mold portions. A different material like metal 70 may be included at this portion for increasing heat transfer and more accurately molding the kayak. Alternately, outwardly extending metallic pins 71 (FIG. 8) may be used to conduct more heat into this area. These are but a few examples. Metal may be laminated in part of the mold to heat that part faster and create a thicker portion in the article. The desired thickness build-up in the article may be provided at any portion by including in the plastic mold at that portion a desired metal laminate or particle. Finely woven metallic wire such as aluminum and copper may be laminated in the mold at desired portions to provide a desired heat transferring and thickness control. Alternately, finely powdered metal may be included in the mold to aid in heat transfer. It is also contemplated that different materials may be utilized in the mold at different portions to provide desired and different coefficients of heat transfer to control thickness build-up in the article being molded with the mold. The various shaped metallic articles, elements, and powders can increase the heat transfer through the resin. Preferably, conductive modifiers with high aspect ratios, length to diameter or thickness, are incorporated into the base resin. Included in this type of heat transfer modifiers are quick-quenched aluminum fibers and flakes. The flakes may be oriented parallel to the plane of flow during the molding process and form layered parts. This provides a high filler content and minimal thickness. Further, to achieve a high aspect ratio, the metal may be either drawn into a wire or formed into the flakes described. In either case, a particle thickness below 100 microns is preferred. In one particularly advantageous embodiment, a suitable plastic mold shell 72 may be utilized over which metal 74 may be sprayed at preselected portions allowing a wide range of different coefficients of heat transfer to be exhibited over the mold to control the thickness of the article. As, for example, in FIG. 9, the top of helmet 40 may be molded thicker by constructing the top of mold A as described. A layer of fiber reinforced thermoset plastic material 50 may then be applied over the sprayed metal portions.

The metallic wire or other conductive material previously described may also be electric wire for resistance heating of a desired mold section for article thickness control.

It is also contemplated that woven or nonwoven metallic material may be included in the mold uniformly to increase the heat transfer rate generally over the entire plastic mold, with or without the treatment of selected portions of the mold with a metallic material as discussed previously. Nonmetal material having a higher heat transfer rate than the matrix material may also be used. As can best be seen in FIGS. 11 and 12, an example of this is shown wherein a kayak mold 80 is illustrated which includes a fiber-reinforced matrix 82 of resinous material. In addition, heat transfer modifier material is included as a layer over the entire mold. Metallic material may be used in a nonwoven or woven form, and may be used with and without additional reinforcement in the form of conventional glass fibers matting, fabric, chopped, etc. Quite advantageously, woven wire 86 is illustrated as the heat transfer rate modifying agent used to speed heat transfer and curing of the polymeric material being molded. In this case, woven glass fibers mat may be dispensed with, and the woven wire provides two functions, one of increasing heat transfer, and the other of providing reinforcement. With the entire plastic mold including metallic material, additional portions of the mold may still be provided with additional heat transfer material to enhance the heat transfer and curing process in that portion, as described previously.

Thus, it can be seen that a highly advantageous construction for a plastic mold and process for rotational molding can be had in accordance with the invention. A simple pattern for the article to be molded may be made from easily tooled material like wood, for example. Next, a mold may be constructed by laying a fiber reinforced resin matrix over the pattern in accordance with conventional lay-up methods. The plastic mold may be finished as desired. The polymeric material from which the article is molded may then be loaded into the mold. Next, the mold may be affixed to any conventional rotational molding machine and placed inside an oven. The plastic mold is suited to a temperature below its heat distortion point, but above the melt point of the polymeric material being molded. The design of the article may be readily changed for short runs or prototyping by simply making a new pattern and constructing a new mold by conventional lay-up or other plastic forming techniques using low cost tooling.

While a preferred embodiment of the invention have been described using specific terms, such description is for illustrative purposes only, and it is to be understood that changes and variations may be made without departing from the spirit or scope of the following claims.

What is claimed is:

1. In a rotational molding process for molding an article from a thermoplastic material which includes rotating a mold containing said thermoplastic material bi-axially to distribute the material in the mold, heating the mold to fuse the thermoplastic material together against an inner surface of the mold, and cooling the mold and removing the article wherein the improvement comprises:
   (a) utilizing a thermoset mold constructed from a thermoset plastic material;
   (b) loading a thermoplastic material in said thermoset mold to form said article being molded;
   (c) heating said thermoset mold and thermoplastic material to a temperature in a range of 300 to 500 degrees F., and a temperature below a heat distortion point of said thermoset mold and above a melt point of said thermoplastic material to cure said thermoplastic material without distorting the thermoset mold; and
   (d) including heat conductive modifiers in said thermoset mold to compensate for a low rate of heat transfer in said thermoset material.

2. The method of claim 1 including using a thermoplastic material having a melt point of about 423 degrees F. or less, and using a thermoset mold material having a heat distortion point greater than about 423 degrees F.

3. The method of claim 1 wherein a woven metallic wire is included in said thermoset mold as said heat transfer modifier.

4. The process of claim 3 including inserting metallic pins into preselected portions of said thermoset mold which are exposed exteriorly of said thermoset mold to compensate for insufficient distribution of heat at said preselected portions.

5. The process of claim 1 wherein said heat transfer modifiers include conductive elements having high aspect ratios.

6. The process of claim 5 including arranging said conductive elements parallel to the plane of flow during said molding process.

7. The process of claim 1 including constructing said rotational thermoset mold by steps of:
   (a) forming a pattern for the article to be molded;
   (b) laying up a matrix over said pattern to form said plastic mold; and
   (c) removing said plastic mold from said pattern.

8. The process of claim 1 including:

(a) constructing said thermoset mold by providing a mold shell;

(b) spraying a metallic material over preselected areas of said mold shell; and (c) applying a backing of matrix material over said sprayed metal material and said mold shell to provide different coefficients of heat transfer over said mold and control the thickness of said article at said portions.

9. In a rotational molding process for molding an article from a thermoplastic material which includes rotating a mold containing said thermoplastic material bi-axially to distribute the material in the mold, heating the mold to fuse the thermoplastic material together against an inner surface of the mold, and cooling the mold and removing the article wherein the improvement comprises:

(a) utilizing a thermoset mold constructed from a thermoset plastic material;

(b) loading a thermoplastic material in said thermoset mold to form said article being molded;

(c) heating said thermoset mold and thermoplastic material to a temperature in a range of 300 to 500 degrees F., and a temperature below a heat distortion point of said thermoset mold and above a melt point of said thermoplastic material to cure said thermoplastic material without distorting the thermoset mold;

(d) including a first heat transfer modifying material in said thermoset mold to increase the overall heat transfer rate of said thermoset mold; and (e) including a second heat transfer modifying material at preselected portions of said thermoset mold to increase the heat transfer heat rate of said preselected portions to provide a preselected thickness profile for the article being molded.

10. The process of claim 9 including using woven wire as said first heat transfer modifier material which is imbedded in said thermoset mold and reinforcing said thermoset mold with said woven wire as well as modifying the heat transfer characteristic of said thermoset mold.

11. The process of claim 9 including:

(a) constructing said thermoset mold by providing a mold shell;

(b) spraying a metallic material over preselected areas of said mold shell; and (c) applying a backing of fiber reinforced material over said sprayed metal material and said mold shell to provide different coefficients of heat transfer over said mold and control the thickness of said article at said portions.

12. The process of claim 9 including constructing said rotational thermoset mold by steps of:

(a) forming a pattern for the article to be molded;

(b) laying up a matrix over said pattern to form said plastic mold; and (c) removing said plastic mold from said pattern.

13. The process of claim 9 including:

(a) constructing said thermoset mold by providing a mold shell;

(b) spraying a metallic material over preselected areas of said mold shell; and (c) applying a backing of matrix material over said sprayed metal material and said mold shell to provide different coefficients of heat transfer over said mold and control the thickness of said article at said portions.

* * * * *